March 7, 1967 A. C. BELVEDERE 3,307,214
TACK CLOTH
Filed Oct. 21, 1963
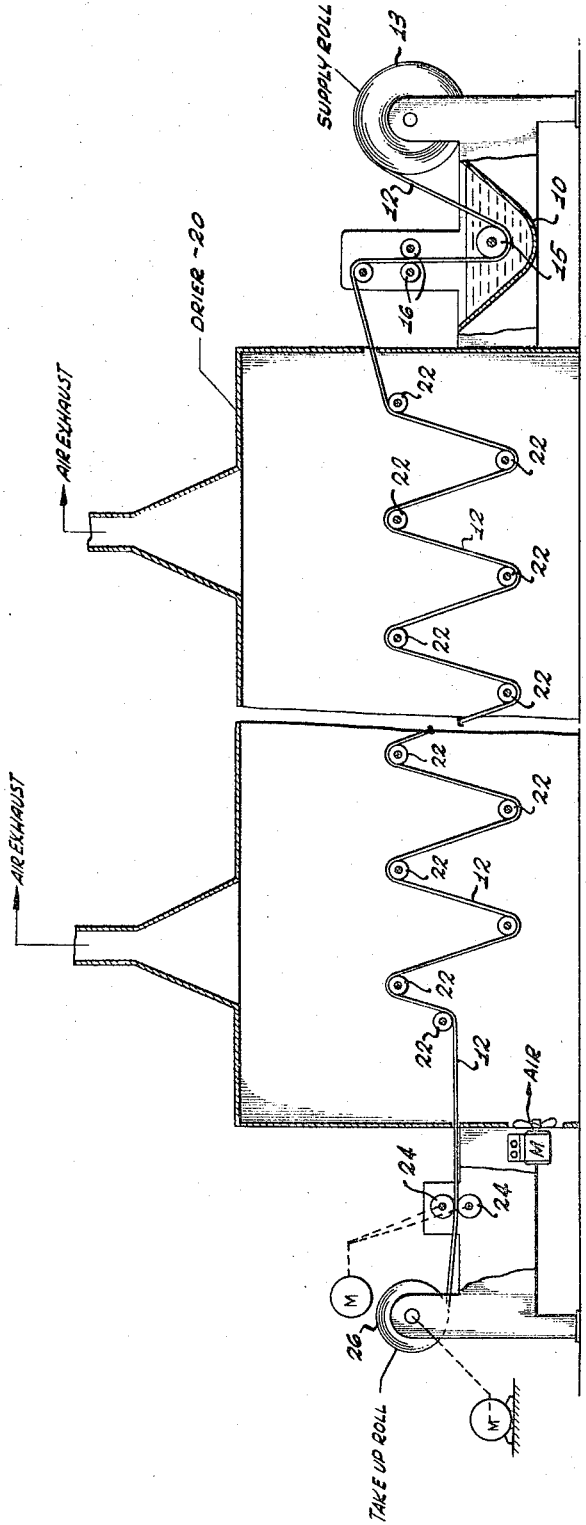
INVENTOR.
ANTHONY C. BELVEDERE
BY Zulurider, Patton, Rieber
Lee, and Utecht
ATTORNEYS

United States Patent Office 3,307,214
Patented Mar. 7, 1967

3,307,214
TACK CLOTH
Anthony C. Belvedere, Downey, Calif., assignor to Harrison Auto Paint Shop, Inc., Los Angeles, Calif., a corporation of Illinois
Filed Oct. 21, 1963, Ser. No. 317,687
8 Claims. (Cl. 15—506)

This invention relates to tack cloths or rags and is directed particularly to a tack cloth or rag that maintains its tackiness over prolonged periods of time under normal conditions and even upon continuous exposure to air.

Tack cloths have long been employed in the automobile refinishing industry to remove dirt, dust, lint, sand particles and any other foreign matter from a surface to be painted, varnished or otherwise finished. Cloths having a tacky surface have been employed for this purpose generally in the painting and varnishing art. Such tack cloths have, in the past, suffered from the disadvantage of drying out very quickly after exposure to air, on the order of days or several weeks at the most. Tack cloths of the prior art normally contain rosin (an amorphous brittle resin obtained mainly from pine stumps by solvent extraction and comprising substantially all abietic acid) which would be very vulnerable to oxidation and quickly lose their tacky character.

Because of this loss of tackiness, those skilled in the art have searched for a substance which, when impregnated on cloth, will retain its tackiness or stickiness as well as its softness and pliability over long periods of time, i.e. on the order of six to nine months at temperatures of between 50° F. to 120° F., the hydrogenated rosin seemed to offer a solution to this problem since it appeared from the chemistry involved, that the hydrogenated rosin would be much less vulnerable to oxidation than rosin in its natural state. While the rate of loss of tackiness of a cheese cloth or the like impregnated with the hydrogenated rosin was decreased, it was still found that the tackiness desired, i.e. of the order of at least six (6) months under the usual storage conditions encountered, was not attained.

Other classes of chemical impregnating agents for cheese cloth and the like for tack cloth use have been employed, but of those of which we are aware, disadvantages exist such as cost, rapidly resulting hardness and inflexibility of the cloth, or toxicity. Further, many so-called tackifiers, when employed in combination with a fire proofing agent, such as a brominated monomeric triallyl phosphate, rapidly lose their tackifying properties or their flexibility. It is further desirable that tack cloths of this invention be fire-resistant or nonflammable, and that they remain soft and pliable throughout their usable life.

In addition to the foregoing requirements of tack cloths, it will be appreciated that as the cloth is used in the refinishing of surfaces to remove dirt, dust, etc. therefrom, electrostatic charges are necessarily built up on the surfaces. In order to minimize the build up of such electric charges, it is found that the incorporation of antistatic properties to the tack cloth is extremely beneficial.

In the past, there has not been, to our knowledge, any tack cloth that will give a quick visual indication of the point at which it has lost its tackiness. Such a tack cloth would have especially significant advantages to a manufacturer, wholesaler or retailer who could estimate, at a glance, the condition of his stock, without having to check individual packages or cartons for their imprinted dates of manufacture.

Bearing in mind the foregoing, it is a major object of the present invention to produce an inexpensive nonflammable tack cloth having incorporated therein, a nontoxic chemical constituent enabling the tack cloth to remain tacky, soft and pliable under normal storage conditions for a period of at least six months or more.

It is a further object of the present invention to provide a tack cloth that will remain tacky for long periods of time, that is, antistatic and fire-resistant and that remains soft and pliable throughout its usable life.

It is yet another object of the present invention to provide a quick visual means for determining when a tack cloth has lost its property of tackiness.

These and other objects will become clearly understood with reference to the following description, and to the accompanying figure which is a schematic flow-sheet of the means for producing the tack cloth of this invention.

In general, in order to obtain the objects of my invention, a multi-ply woven or non-woven fibrous material, such as cheese cloth, or other cellulosic cloth, is impregnated with a solution containing the glycerol ester of hydrogenated rosin, together with a fireproofing agent such as a brominated monomeric triallyl phosphate. The impregnating solution may also contain a light and heat sensitive dye or pigment that changes color after a specific storage period has elapsed under conditions of heat and light encountered in normal storage, such period of time being coincident with the dryout time of the tack cloth. Also, it is preferable to add to the impregnating solution an antistatic agent such as stearamidopropyldimethyl-β-hydroxyethylammonium nitrate, and a plasticizer such as ethylene glycol or hexylene glycol, to insure that the tack cloth will remain soft and pliable throughout its usable life, i.e. for as long as the tackiness of the cloth is present.

In order to best achieve the objects of my invention, the impregnating solution comprises the following combination of chemical ingredients:

| | Optimum Parts by Weight | Preferred Ranges |
| --- | --- | --- |
| (a) Glycerol ester of hydrogenated rosin [1] (75% rosin in a 25% toluene solution) | 75 | 60–135 |
| (b) Tri-(2,3 dibromopropyl) phosphate | 105 | 90–130 |
| (c) Ethylene glycol | 36 | 28–40 |
| (d) Stearamidopropyldimethyl-β-hydroxyethylammonium nitrate [2] (50% solution in an isopropyl alcohol-water mixture) | 1 | 0.5–3 |
| (e) Irgacet Brill blue #2GL [3] | 0.2 | 0.1–1 |
| (f) Toluene | 80 | 60–90 |

[1] Manufactured by Hercules Powder Company, Pine & Paper Chemicals Department, Wilmington 99, Delaware, under the trademark Staybelite Ester 10, Acid Number 8, Softening point 183°F., Viscosity at 25° C. (Gardner-Holdt) I–M.
[2] Manufactured by American Cyanamid Company, Intermediates Department, Bound Brook, New Jersey, under the trademark Catanac® SN.
[3] Heat and light sensitive dye manufactured by Geigy Industrial Chemicals, Ardsley, New York.

The chemical ingredients are placed in a dip tank 10 (see the figure), and admixed. The cloth 12 to be impregnated is then sent to the dip tank from a stock roll 13, passed around a guide roll 15, and thence between a pair of squeeze rolls 16.

The impregnated cloth 12 is then sent to an enclosed drying cabinet or zone 20. The cheese cloth is here exposed to a stream of air, by being passed around a series of staggered guide rolls 22, for the purpose of causing evaporation of the solvent which, in this case, is toluene. Other relatively volatile solvents, such as xylene or mineral spirits, may be employed.

The cloth 12 emerges from the drier cabinet 20 and is pulled by a motor-driven pair of drive rolls 24 onto a take-up roll 26, or alternatively, can be sent directly to a cutter (not shown) for the making of small cloths.

The finished cloth is tacky or sticky to the touch, soft and pliable, fireproof and antistatic, and remains so under normal conditions of storage for periods of approximately six months. The softness and pliability of the tacky cloth is present because of the particular combination of tackifier and fireproofing agent used, and is further enhanced by the utilization of a plasticizer, e.g. ethylene or hexylene glycol. The fire retardant property is provided by the brominated phosphate compound.

As mentioned earlier, this type of fireproofing compound, while very effective, has a tendency to cause a rapid hardening of the tack cloth if ordinary rosin, hydrogenated rosin, or the usual esters of rosins are employed. In fact, even with the particular glycerol ester of a hydrogenated rosin utilized in this invention, particular proportions of brominated phosphate to the Staybelite Ester 10 should be employed in order that the tack cloth remain soft and pliable as well as tacky. Thus, the optimum ratio, by weight, of Staybelite Ester 10 to the brominated phosphate compound has been found to be about 3:4, whereas the preferred ratios lie between 1:2 and 1.5:1. Below the 1:2 ratio, the cloth has little tacky character, and above about a 1.5:1 ratio, the cloth becomes hard.

The light and heat sensitive dye employed is designed to undergo a definite color change after a time has elapsed substantially coincident with the time of the tackiness of the cloth under normal storage conditions, i.e. approximately six months. In the case of Irgacet Brill blue #2GL (which is an organic thiozol), the color change is from blue to green after a time of six months has elasped under storage conditions of darkness and 70° F. temperature.

There are many heat and light sensitive dyes that can be employed, such as an anthraquinone dye and tannic acid.

The following tests show the substantial differences resulting from the use of the glycerol ester of hydrogenated rosin in the optimum formulation described above, as compared with the use of other rosins.

Solutions labeled I through V below were prepared and used in impregnating cheese cloth. The results of the tests follow:

| Solutions | Remarks |
|---|---|
| I: (a) 75 parts glycerol ester of rosin (non-hydrogenated). (b) Remaining ingredients and concentrations same as in optimum solution set forth above. | Resulting cloth is hard and not pliable. |
| II: (a) 75 parts of wood rosin. (b) Remaining ingredients and concentrations same as in optimum solution set forth above. | Resulting cloth is hard and not pliable. |
| III: (a) 75 parts of polymers of beta pinene (nopinene) rosin (manufactured by Pennsylvania Industrial Chemical Corporation, Clairton, Pennsylvania, under the trademark Piccolyte). (b) Remaining ingredients and concentrations same as in optimum solution set forth above. | Resulting cloth is hard and not pliable. |
| IV: (a) 75 parts of ethylene glycol ester of polymerized rosin. (b) Remaining ingredients and concentrations as in optimum solution set forth above. | Resulting cloth is hard and not pliable; tackiness low. |
| V: (a) 75 parts of pentaerythritol ester of hydrogenated rosin. (b) Remaining ingredients and concentrations as set forth in optimum solution set forth above. | Resulting cloth is hard, not pliable. |

Furthermore, the tackiness of the cloth is very low compared to the cloth made by impregnation with the solution containing Staybelite Ester 10.

It will be clearly seen from the foregoing results that the specific combination of the glycerol ester of hydrogenated rosin with the brominated triallyl phosphate for the making of a tacky fireproof cloth has substantial advantages. In addition, the incorporation of the antistatic agent, plasticizers and light and heat sensitive dyes further enhance the practical utility of the tack cloth.

While I have shown and described a preferred method of manufacture and an optimum formulation, modifications and equivalents will become apparent to those skilled in the art that lie within the scope of my invention. Hence, I intend to be bound only by the claims which follow.

I claim:

1. A tack cloth, which comprises: a fibrous material impregnated with a combination consisting essentially of a brominated monomeric triallyl phosphate and the glycerol ester of hydrogenated rosin, the ratio of said glycerol ester of hydrogenated rosin to said brominated monomeric triallyl phosphate lying in the range between about 1:2 and 1.5 to 1.

2. The tack cloth of claim 1 wherein the brominated monomeric triallyl phosphate is tri-(2,3-dibromopropyl) phosphate, and wherein the ratio of said glycerol ester of hydrogenated rosin to said tri-(2,3-dibromopropyl) phosphate lies in the range between about 1:2 and 1.5:1.

3. The tack cloth of claim 1 wherein the combination includes an antistatic agent.

4. The tack cloth of claim 1 wherein the combination includes a plasticizer selected from the group consisting of ethylene and hexylene glycol.

5. The tack cloth of claim 1 wherein the combination includes
   stearamidopropyldimethyl-$\beta$ - hydroxyethylammonium nitrate.

6. The tack cloth of claim 2 wherein the ratio of said glycerol ester of hydrogenated rosin to said tri-(2,3-dibromopropyl) phosphate is about 3:4.

7. The tack cloth of claim 2 wherein the combination includes a light and heat sensitive dye.

8. A tack cloth which comprises:
   a fibrous web impregnated with a combination consisting essentially of:
   about 75 parts of glycerol ester of hydrogenated rosin, about 105 parts of tri-(2,3-dibromopropyl) phosphate, about 36 parts of ethylene glycol,
   and about 1 part stearamidopropyldimethyl-$\beta$-hydroxyethylammonium nitrate and less than 1 part of a light and heat sensitive dye adapted to change color after a specific period of time has elasped substantially coincident with the loss of tacky character of said tack cloth.

References Cited by the Examiner

UNITED STATES PATENTS

| 2,633,593 | 4/1953 | Wright et al. | |
| 2,662,834 | 12/1953 | Paist et al. | 117—136 X |
| 3,016,555 | 1/1962 | Penoyer | 117—122 X |
| 3,028,618 | 4/1962 | Lyman. | |

WILLIAM D. MARTIN, *Primary Examiner.*

T. G. DAVIS, *Assistant Examiner.*